(12) United States Patent
Van den Berg

(10) Patent No.: US 10,792,595 B2
(45) Date of Patent: Oct. 6, 2020

(54) DRUM FILTER FOR WATER FILTRATION AND METHOD THEREFOR

(71) Applicant: Bart Van den Berg, Hoevelaken (NL)

(72) Inventor: Bart Van den Berg, Hoevelaken (NL)

( * ) Notice: Subject to any disclaimer, the term of this patent is extended or adjusted under 35 U.S.C. 154(b) by 645 days.

(21) Appl. No.: 15/303,128

(22) PCT Filed: Apr. 7, 2015

(86) PCT No.: PCT/NL2015/050222
§ 371 (c)(1),
(2) Date: Oct. 10, 2016

(87) PCT Pub. No.: WO2015/160239
PCT Pub. Date: Oct. 22, 2015

(65) Prior Publication Data
US 2017/0036143 A1 Feb. 9, 2017

(30) Foreign Application Priority Data
Apr. 15, 2014 (NL) .................................. 2012621

(51) Int. Cl.
| | | |
|---|---|---|
| *B01D 33/073* | (2006.01) | |
| *B01D 33/46* | (2006.01) | |
| *B01D 33/80* | (2006.01) | |
| *C02F 1/00* | (2006.01) | |

(52) U.S. Cl.
CPC ......... *B01D 33/073* (2013.01); *B01D 33/463* (2013.01); *B01D 33/807* (2013.01); *C02F 1/001* (2013.01); *C02F 2209/42* (2013.01); *C02F 2303/16* (2013.01); *C02F 2303/20* (2013.01)

(58) Field of Classification Search
None
See application file for complete search history.

(56) References Cited

U.S. PATENT DOCUMENTS

| | | | | |
|---|---|---|---|---|
| 1,554,943 A | * | 9/1925 | Antoine ................... | D21F 1/66 210/106 |
| 4,056,473 A | | 11/1977 | Nilsson | |
| 4,303,524 A | * | 12/1981 | Richards ................ | B01D 35/18 210/149 |
| 4,765,894 A | * | 8/1988 | Inaba ..................... | B01D 33/15 210/393 |
| 5,373,711 A | * | 12/1994 | Takemoto .............. | D04B 35/32 66/168 |

(Continued)

FOREIGN PATENT DOCUMENTS

| | | |
|---|---|---|
| DE | 4216484 | 11/1993 |
| DE | 4326018 | 2/1994 |
| EP | 0221565 | 5/1987 |

*Primary Examiner* — Robert J Popovics
(74) *Attorney, Agent, or Firm* — Marcus C. Dawes; Daniel L. Dawes

(57) ABSTRACT

The invention relates to a drum filter for water filtration and method therefor. The drum filter comprises: a housing; a filter drum arranged in the housing and comprising a filter surface, wherein the filter drum is rotatable around a shaft; an inlet for supplying water for filtering to an outward facing side of the filter surface for the purpose of collecting fouling on the filter surface; an outlet for discharging filtered water; and a sprayer for spraying clean the filter surface, wherein the sprayer is configured to spray substantially transversely over the outward facing side of the filter surface.

19 Claims, 10 Drawing Sheets

(56) References Cited

U.S. PATENT DOCUMENTS

Figures 4A, 4B:
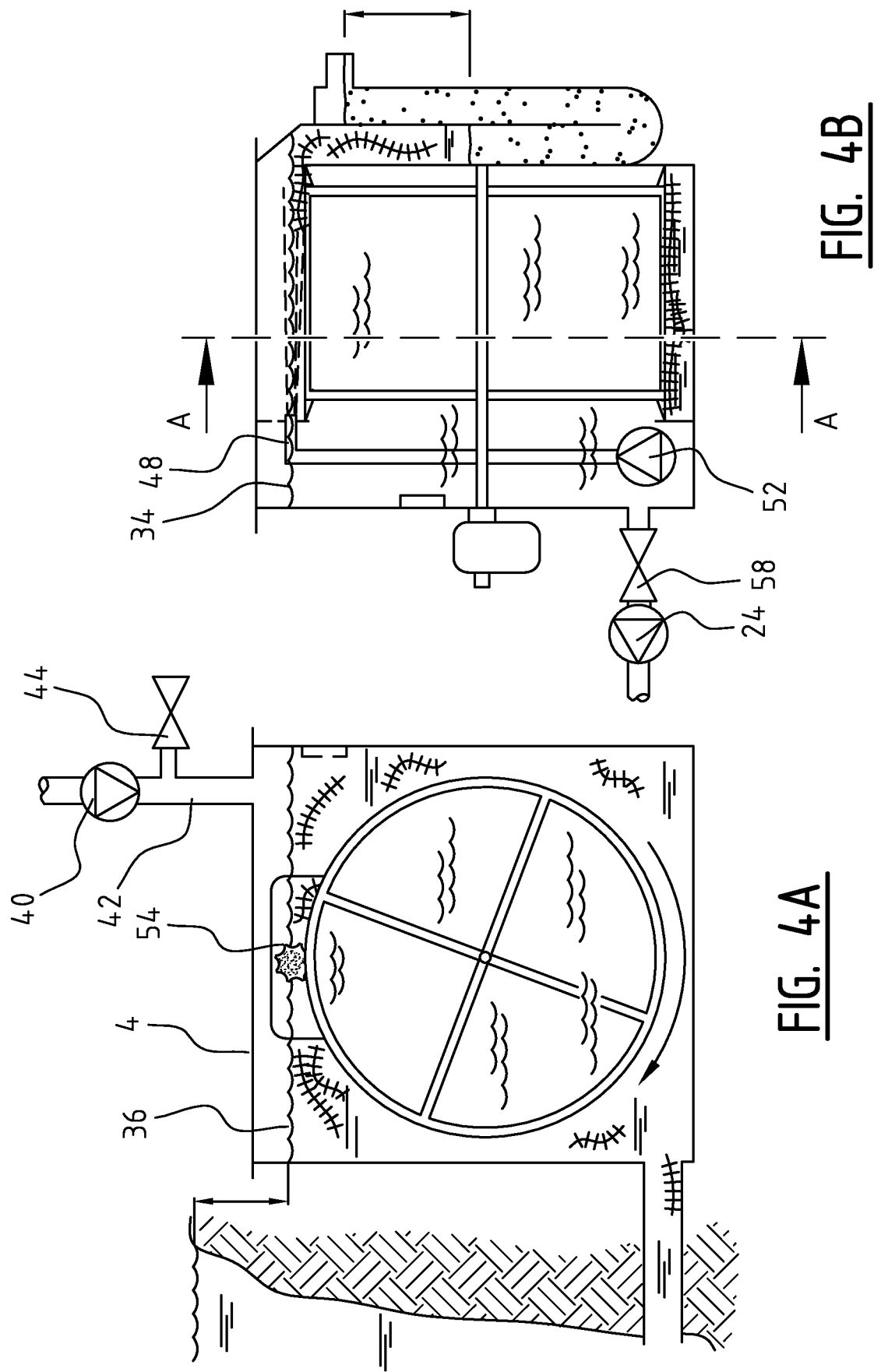

| | | | | |
|---|---|---|---|---|
| 5,423,977 A * | 6/1995 | Aoki | ............... | B01D 33/073 210/107 |
| 5,464,542 A * | 11/1995 | Grienberger | ............... | B01D 29/15 210/784 |
| 5,470,472 A * | 11/1995 | Baird | ............... | B01D 33/073 210/391 |
| 5,470,473 A * | 11/1995 | Park | ............... | B01D 33/073 210/402 |
| 5,558,042 A * | 9/1996 | Bradley | ............... | A01K 63/045 119/226 |
| 5,565,110 A * | 10/1996 | Brady | ............... | B01D 33/073 210/770 |
| 5,589,079 A * | 12/1996 | Park | ............... | B01D 33/073 210/391 |
| 5,759,397 A * | 6/1998 | Larsson | ............... | B01D 33/073 210/331 |
| 5,798,039 A * | 8/1998 | Wiesemann | ............... | B01D 33/067 210/232 |
| 5,897,788 A * | 4/1999 | Ketolainen | ............... | B01D 33/073 210/784 |
| 6,000,557 A * | 12/1999 | Ku | ............... | B01D 33/073 210/391 |
| 6,409,929 B2 * | 6/2002 | Bott | ............... | B01D 33/073 210/770 |
| 6,500,344 B1 * | 12/2002 | Lee | ............... | B01D 24/08 210/744 |
| 6,800,197 B1 * | 10/2004 | Kosola | ............... | B01D 33/073 210/193 |
| 6,906,227 B2 * | 6/2005 | Neumann | ............... | C07C 37/70 210/402 |
| 8,518,273 B2 * | 8/2013 | Lownertz | ............... | D21C 11/0064 162/30.11 |
| 8,679,335 B1 * | 3/2014 | Dufort | ............... | B01D 35/02 134/104.4 |
| 9,248,455 B2 * | 2/2016 | Teduka | ............... | B01D 9/004 |
| 9,956,510 B2 * | 5/2018 | Bastenhof | ............... | B01D 33/11 |
| 9,968,872 B2 * | 5/2018 | Carayon | ............... | B01D 33/801 |
| 10,391,429 B2 * | 8/2019 | Carayon | ............... | B01D 33/801 |
| 10,549,224 B2 * | 2/2020 | Carayon | ............... | B01D 33/503 |
| 2017/0036143 A1 * | 2/2017 | Van den Berg | ............... | B01D 33/073 |

* cited by examiner

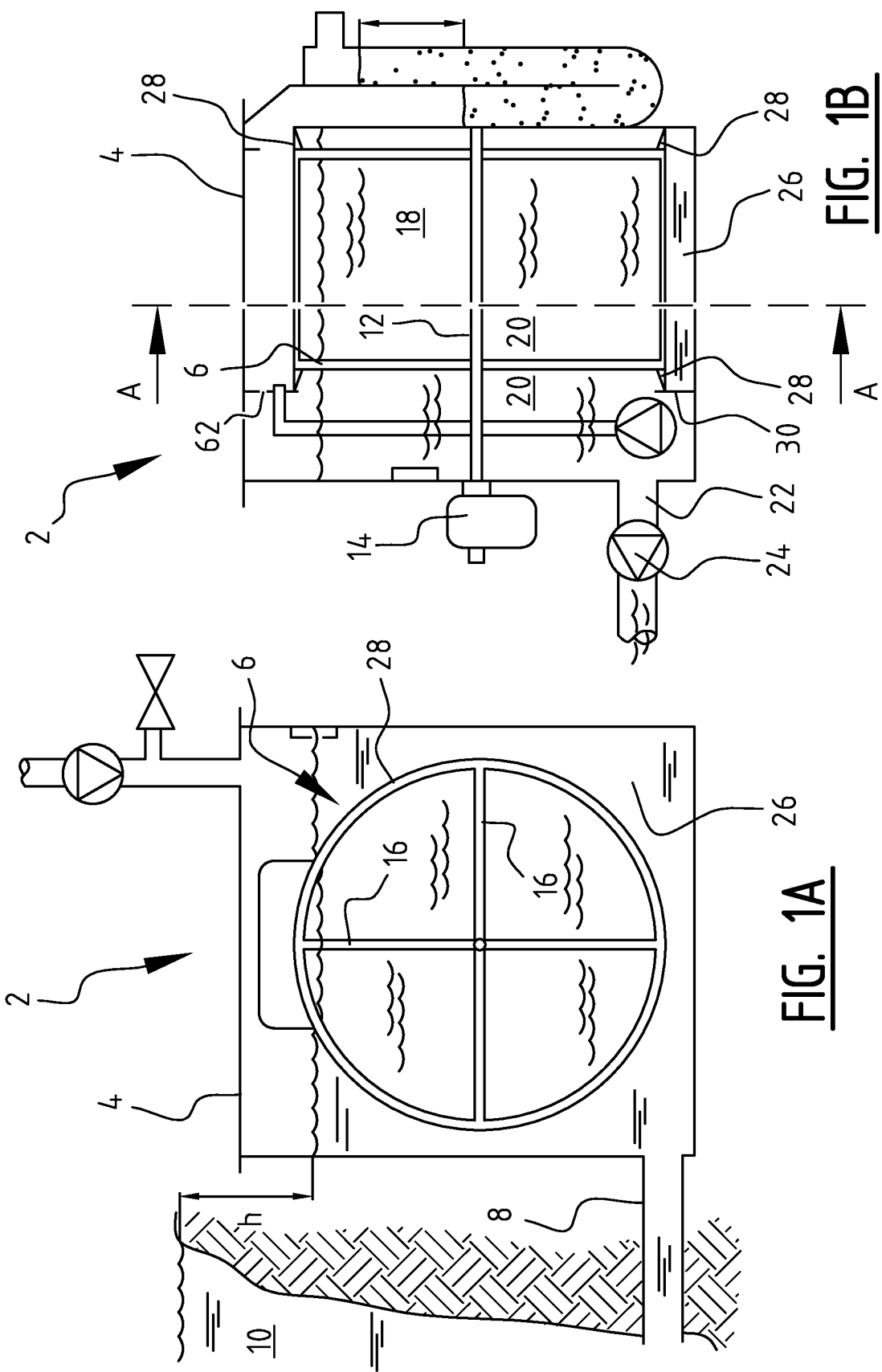

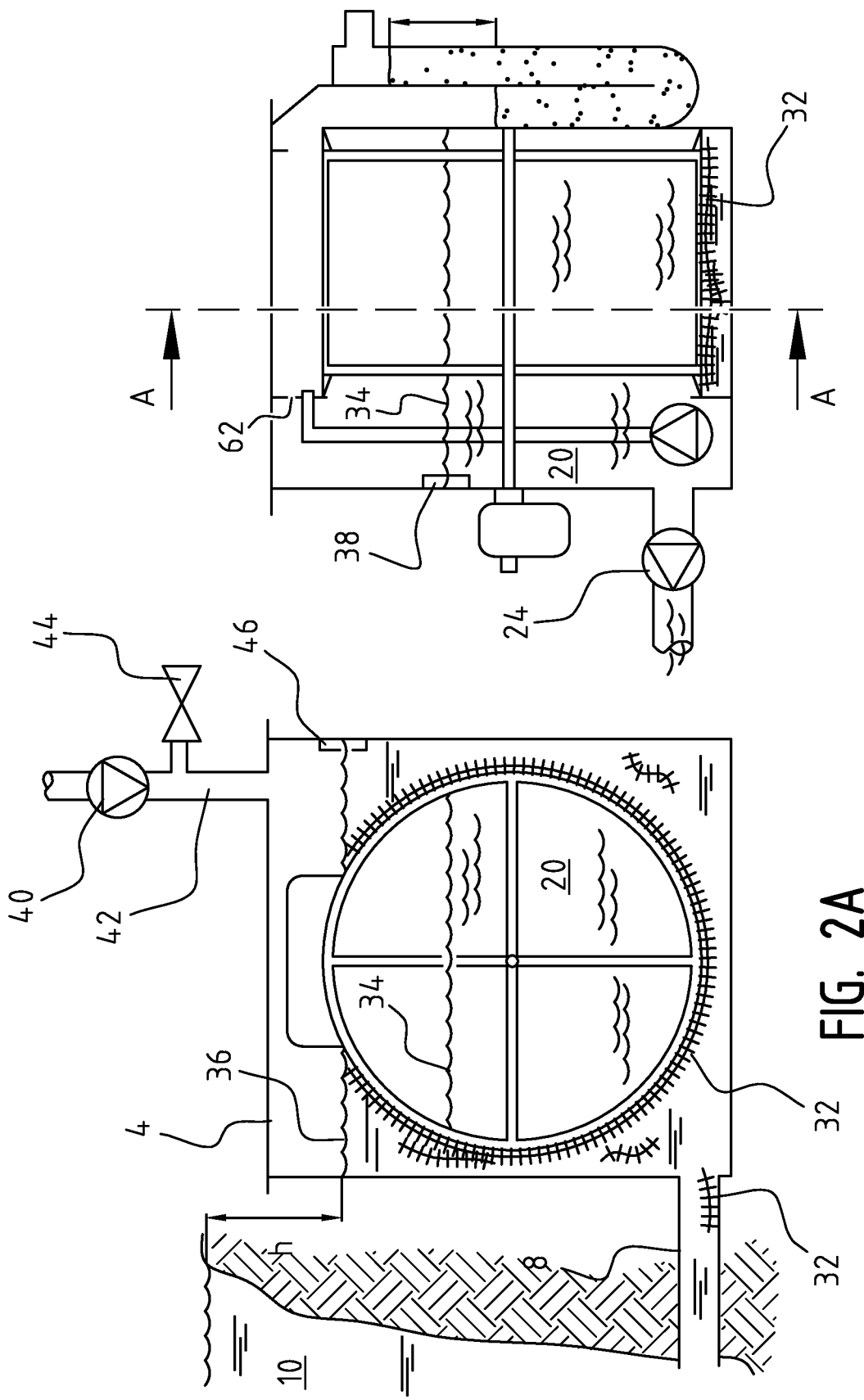

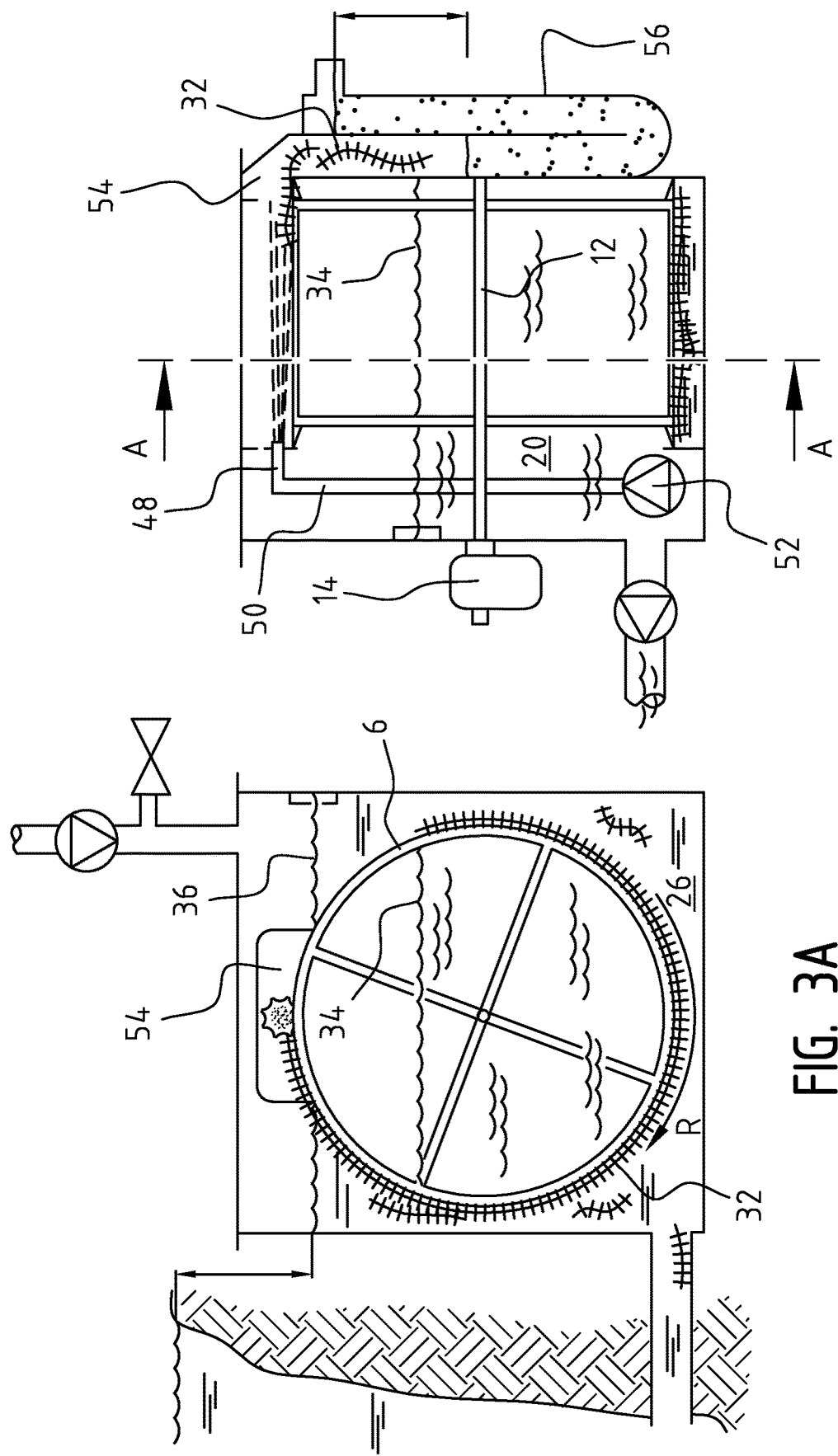

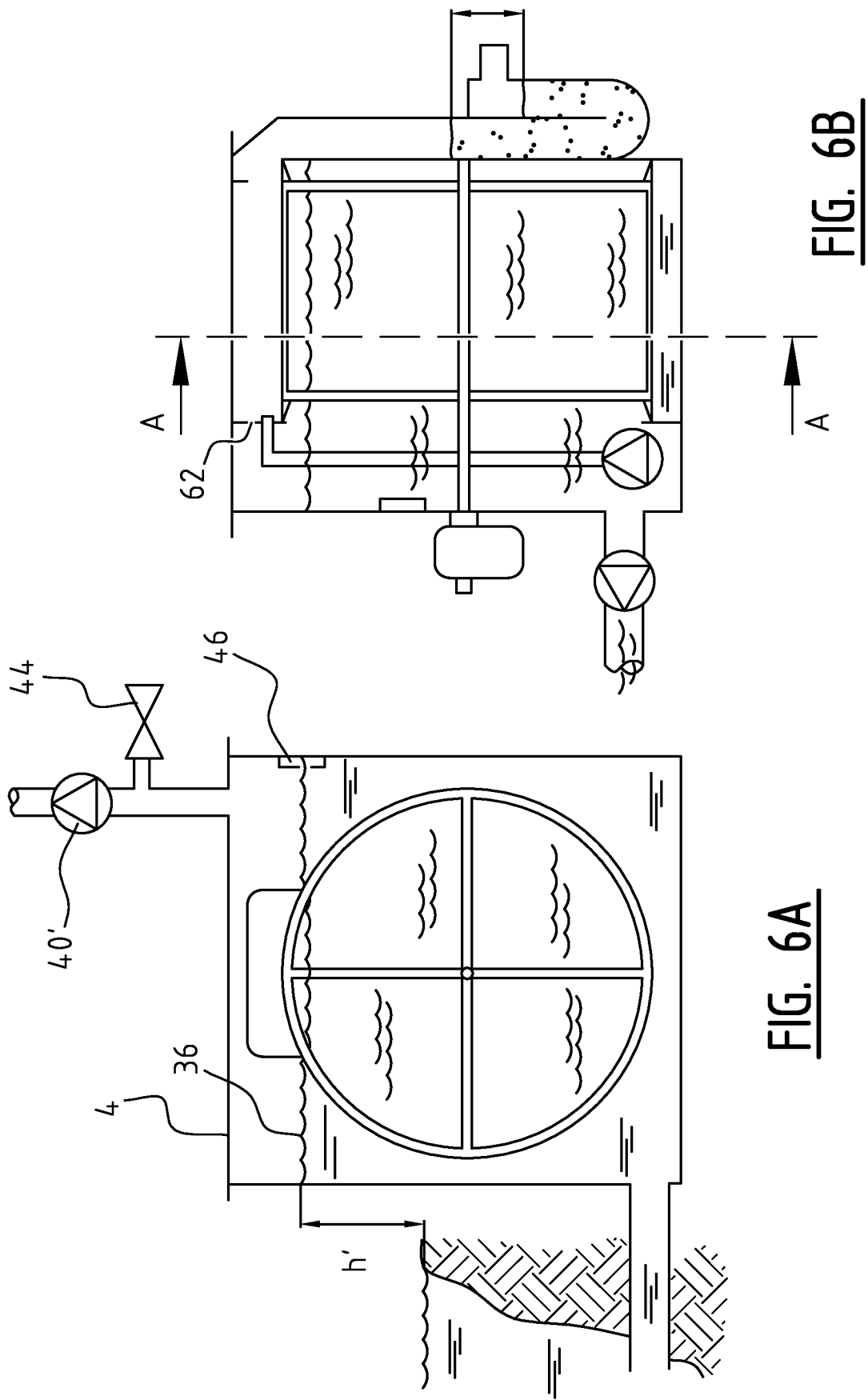

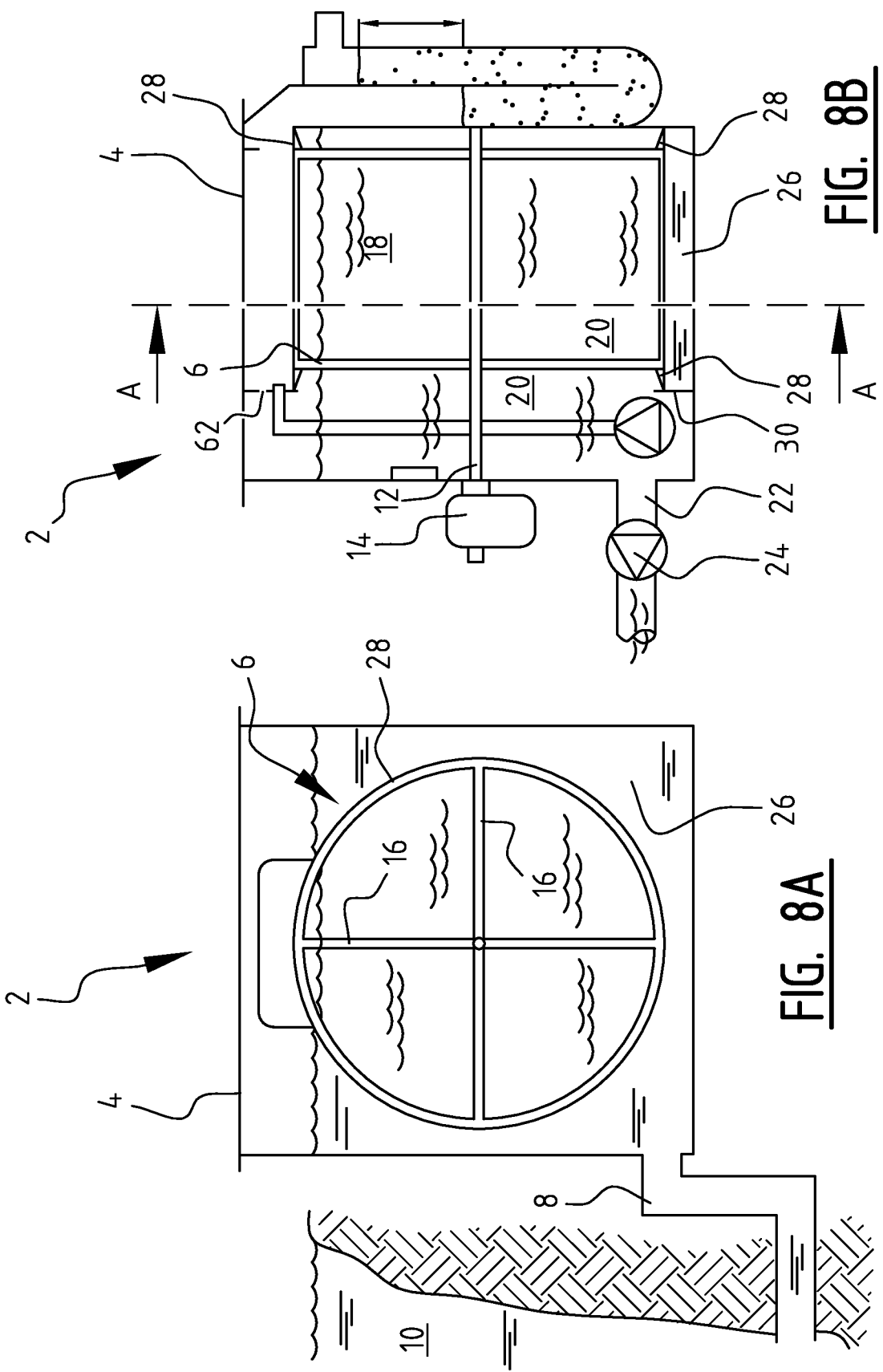

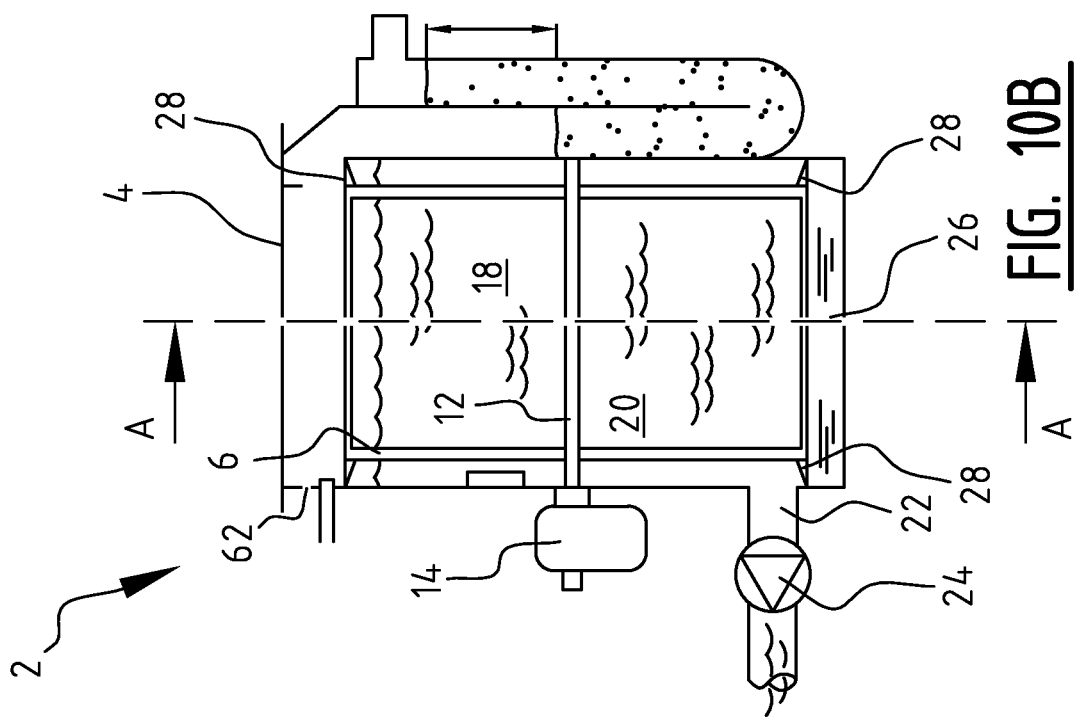
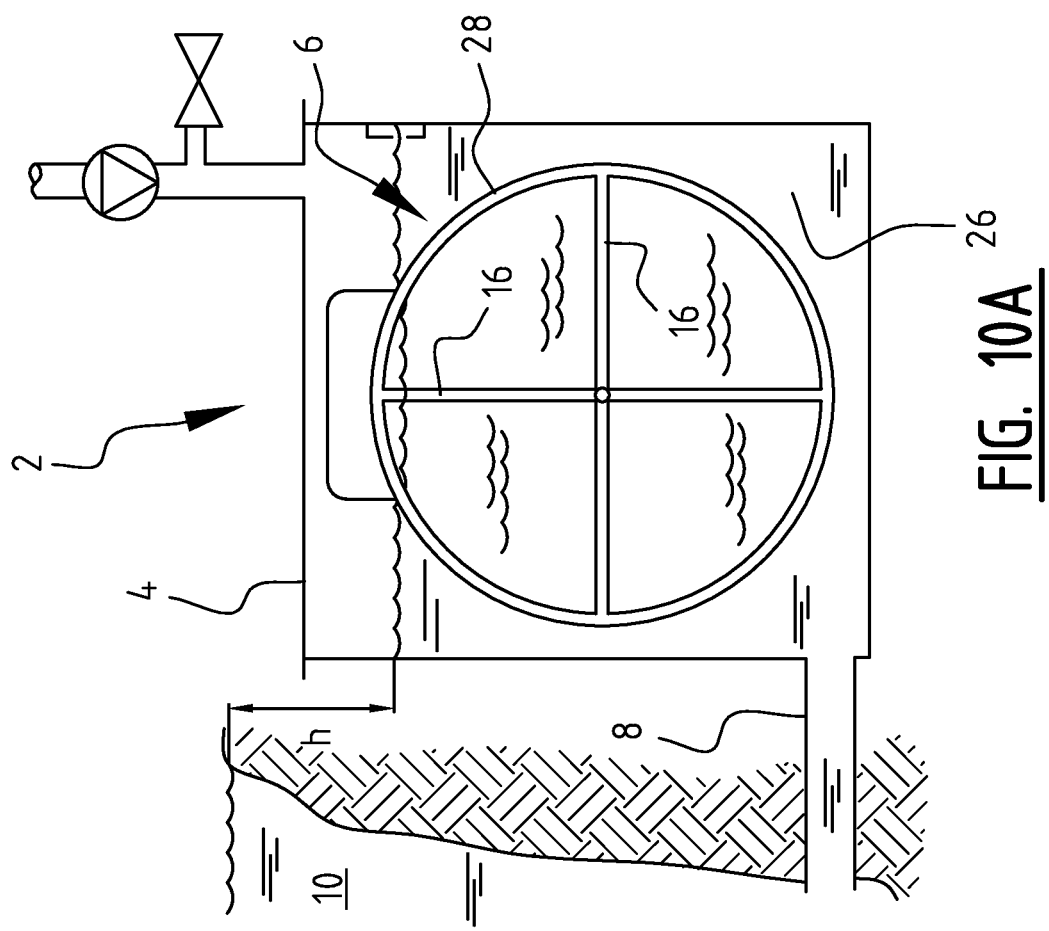

DRUM FILTER FOR WATER FILTRATION AND METHOD THEREFOR

The invention relates to a drum filter for water filtration. Drum filters bring about a mechanization filtration wherein solids (fouling) are removed from the water. It is for instance desirable in the case of ponds with fish to filter the water. Solids, such as excreta of fish, leaves and filamentous algae, are removed from the water using a drum filter. This is favourable for the health of the fish. The pond moreover looks clean because of the filtering, and an unpleasant odour is prevented or at least reduced.

Drum filters are known in practice which comprise a cylindrical filter drum provided with a filter surface. In these conventional drum filters the water for cleaning is supplied on the inner side of the drum filter. The water passes through the filter surface to the outer side of the filter drum and the fouling remains behind on the inward facing side of the filter surface. Sprayers are provided on the outer side of the filter drum. These sprayers are located on an upper side of the filter drum. The sprayers are configured to spray water through the filter surface. Provided on the inner side of the filter drum is a gutter which is arranged opposite the sprayer. The gutter receives fouling which is sprayed off the filter surface by the water from the sprayers and discharges it to the sewer.

A drawback of the conventional drum filters is that not all the fouling which is sprayed off the filter surface also actually finishes up in the gutter. Some of the fouling drops into the water for cleaning. Although this fouling is filtered out of the water again at a later stage, the known drum filters are hereby not very efficient. The fouling can moreover also come to lie on the edge of the gutter, whereby a layer of fouling builds up, thereby creating an undesirable, uncontrollable situation. The gutter can in addition become wholly clogged. This requires the drum filter to be manually cleaned at set times. In short, the conventional drum filters require intensive maintenance.

An object of the invention is to obviate the above stated problems and to provide a drum filter for efficient and effective water filtration.

This object is achieved with the drum filter for water filtration according to the invention, comprising:
a housing;
a filter drum arranged in the housing and comprising a filter surface, wherein the filter drum is rotatable around a shaft;
an inlet for supplying water for filtering to an outward facing side of the filter surface for the purpose of collecting fouling on the filter surface;
an outlet for discharging filtered water; and
a sprayer for spraying clean the filter surface, wherein the sprayer is configured to spray substantially transversely over the outward facing side of the filter surface.

Because fouling can be collected on the outer side of the filter surface it is possible to dispense with a gutter on the inner side of the filter drum. This avoids the above stated problems in respect of such a discharge gutter.

The sprayer sprays the fouling away with a fluid such as water or air. The fouling is preferably sprayed away with water. An effective discharge of the fouling is hereby achieved.

In conventional drum filters the water level in the filter should always remain below the gutter since otherwise the fouling in the gutter will mix once again with the water for cleaning and loss of water occurs through discharge to the sewer. Because in the drum filter according to the invention a gutter need not be present on the inner side of the filter drum, a greater part of the filter surface can come to lie under water. This means that a greater part of the filter surface can make contact with the water for filtering, whereby more effective filtration becomes possible. Undesired water discharge to the sewer is moreover reduced.

The filter surface forms for instance a separation between an inlet chamber, in which the water for filtering is supplied, and an outlet chamber where the filtered water is collected and subsequently discharged. The drum preferably comprises a seal for separating the inlet chamber from the outlet chamber, so that substantially no liquid is exchanged—except through the filter surface—between the inlet chamber and outlet chamber. The seal for instance comprises rubber. The filter drum is for instance provided with a rubber seal on a peripheral edge. This rubber seal is preferably attached to the filter drum so that it co-rotates with the drum.

The sprayer is preferably configured to spray substantially in a direction parallel to the shaft.

In a preferred embodiment the drum filter comprises a fouling discharge with a receiving opening arranged substantially opposite the sprayer for the purpose of receiving fouling sprayed off the filter surface in the direction of the receiving opening by the sprayer.

In a further preferred embodiment the drum filter comprises an additional sprayer which is arranged in the housing and which is configured to spray a fluid substantially through the filter surface.

Depending on the type of filter surface, fine fouling particles can accumulate in the filter surface. The filter surface can hereby become clogged to some extent. The additional sprayer sprays a fluid such as water or air from outside to inside through the filter surface. The fine fouling particles are hereby removed from the filter. In a subsequent cleaning step the fine fouling particles are removed with the coarser fouling particles by the fluid which is sprayed transversely over the filter surface.

The additional sprayer is preferably configured to spray the fluid substantially in a direction perpendicularly of the shaft.

In a preferred embodiment the drum filter further comprises a drive connected to the shaft for the purpose of rotating the filter drum and a controller which is operatively connected to the drive and to the sprayer and/or the additional sprayer, which controller is configured to perform a cleaning step by rotating the filter drum and/or spraying with the sprayer and/or the additional sprayer.

The controller is for instance configured to first rotate the filter drum. A part of the filter surface which has collected fouling from the water is thus positioned in front of the sprayer. The controller then controls the sprayer in order to spray clean said part of the filter surface. In another example a cleaning step comprises of having the filter drum perform at least one full rotation while the sprayer sprays the dirt from the filter surface. The filter drum then for instance performs a second rotation wherein the additional sprayers wash fine fouling particles from the filter surface.

In a further preferred embodiment the drum filter comprises a level sensor configured to measure a water level in the filter drum, wherein the controller is configured to start the cleaning step when a water level in the filter drum measured by the level sensor falls below a determined threshold value.

The level sensor is for instance arranged in an outlet chamber of the filter for the purpose of measuring the level of filtered water in the housing. If the filter surface is fouled, less water will flow through the filter surface and to the inner side of the drum. This results in the water level on the outlet side of the filter surface falling relative to the water level on the inlet side of the filter surface. If the water level falls below a predetermined threshold value, this is therefore indicative of a fouled filter. The effectiveness of filtration is maintained by measuring the water level and performing the cleaning step on the basis thereof.

In a further preferred embodiment the controller is configured to reverse the rotation direction of the filter drum after one or more cleaning steps.

In a preferred embodiment the drum filter is configured such that the pressure on the inner side of the filter drum and the pressure on the outer side of the filter drum are substantially equal.

In some conventional systems the water is pressed through the filter surface using a pressure difference between inner side and outer side of the filter drum. This has the drawback however that a relatively compact fouling layer results on the filter surface which is difficult to remove. Maintaining substantially equal pressure on both sides of the filter surface makes it easy to remove the fouling with the sprayer.

In a preferred embodiment the drum filter comprises means for regulating the water level. The means can be configured to regulate the water level on an inlet side and/or an outlet side of the filter surface.

The means for regulating the water level for instance comprise a valve and/or pump arranged in the inlet and/or outlet.

The housing is however preferably embodied as pressure chamber and the drum filter further comprises:
- an air pump for adjusting an air pressure in the housing;
- a level sensor configured to measure a water level in the housing; and
- a controller configured to control the air pump on the basis of the water level measured by the level sensor for the purpose of setting a water level in the housing.

In other words, the means for regulating the water level are formed by the air pump, the level sensor and the controller. The means for regulating the water level preferably likewise comprise a valve which is preferably also controlled by the controller.

A desired water level is set using the controller. When the level sensor detects that the water level is above the desired water level, the controller can control the air pump in order to increase the air pressure in the housing, so that the water level drops. When the level sensor detects that the water level is below the desired water level, the controller can switch off the air pump and open the air valve in order to reduce the air pressure in the housing, so that the water level rises.

The means for regulating the water level are preferably configured to set the water level such that the greatest possible part of the filter surface of the drum is under water while the water level remains below the level of the fouling discharge. This achieves that the filter surface is utilized to the maximum, as also described above. The water for filtering is at the same time prevented from simply leaving the device via the fouling discharge. The water level is for instance set to just below the fouling discharge.

In the case of a power failure the water level in the housing will rise in conventional drum filters because the pumps are disabled. The water level could then rise above the discharge gutter on the inner side of the drum. A part of the pond could in this way empty via the discharge gutter. The conventional systems are therefore configured to hold the water level a considerable distance below the discharge gutter in the normal operating mode. A rise in the water level can in this way be compensated in the case of power failure. This however has the result for normal operation that an (even) smaller part of the filter surface is in contact with the water for cleaning. This reduces the effectiveness of the filtration of conventional systems. The invention solves these problems. The pressure chamber guarantees that the water level will not change, or at least hardly so, in the case of a power failure. The fouling discharge in the drum filter according to the invention is moreover preferably arranged on an upper side of the drum, so that a greater part of the filter surface can be placed under water.

In a further preferred embodiment the drum filter according to the invention comprises a fouling discharge with a receiving opening as described above arranged substantially opposite the sprayer, wherein the air pump, the level sensor and the controller, and optionally the air valve, are moreover provided as means for regulating the water level, wherein the fouling discharge comprises a swan neck.

The swan neck achieves that the air pressure is maintained in the housing, even when fouling is discharged via the fouling discharge.

In a preferred embodiment the drum filter comprises a supply conduit connected to the sprayer and configured to supply filtered water to the sprayer.

Water can be saved by using filtered water to spray the filter surface clean.

A pump is for instance accommodated in an outlet chamber where filtered water is collected during use. The pump lies under water during use and pumps filtered water from the outlet chamber to the sprayer during a cleaning step.

The invention further relates to a method for providing a drum filter, comprising the following steps of:
- providing a housing;
- arranging in the housing a filter drum which comprises a filter surface, wherein the filter drum is arranged for rotation around a shaft;
- carrying water for filtering from an outward facing side of the filter surface to the inner side of the drum filter for the purpose of collecting fouling on the outward facing side of the filter surface;
- spraying the filter surface clean by spraying a fluid substantially transversely over the outward facing side of the filter surface.

The method according to the invention has the same advantages and effects as described above in respect of the drum filter. Features of the method and the drum filter can particularly be combined as required.

In a preferred embodiment the method comprises of embodying the housing as pressure chamber and providing air with a pressure differing from atmospheric pressure.

The air pressure can be above or below atmospheric pressure. The air pressure is alternatively equal to atmospheric pressure.

In a further preferred embodiment the method comprises of coupling the inlet of the drum filter to a basin with water for cleaning and of setting a desired water level in the housing by controlling the air pressure in the pressure chamber, wherein the desired water level differs from the water level in the basin.

The air pressure in the housing is for instance set above atmospheric pressure so that the drum filter can be placed below the water level of the basin without the whole housing filling with water because of the water column on the inlet side. This has the advantage that the drum filter can be concealed below ground without this affecting the operation of the filter. In addition to having an aesthetic advantage, this also has the advantage of noise reduction. Concealing the drum filter is particularly relevant in the case of a pond, such as a pond for ornamental fish.

Further advantages, features and details of the invention are elucidated on the basis of preferred embodiments thereof, wherein reference is made to the accompanying drawings. In the following figures figure A shows in each case a rear view and figure B in each case a side view of an embodiment of a drum filter according to the invention. The rear view is a cross-section along the line A-A in figures B.

Figures 5A, 5B:
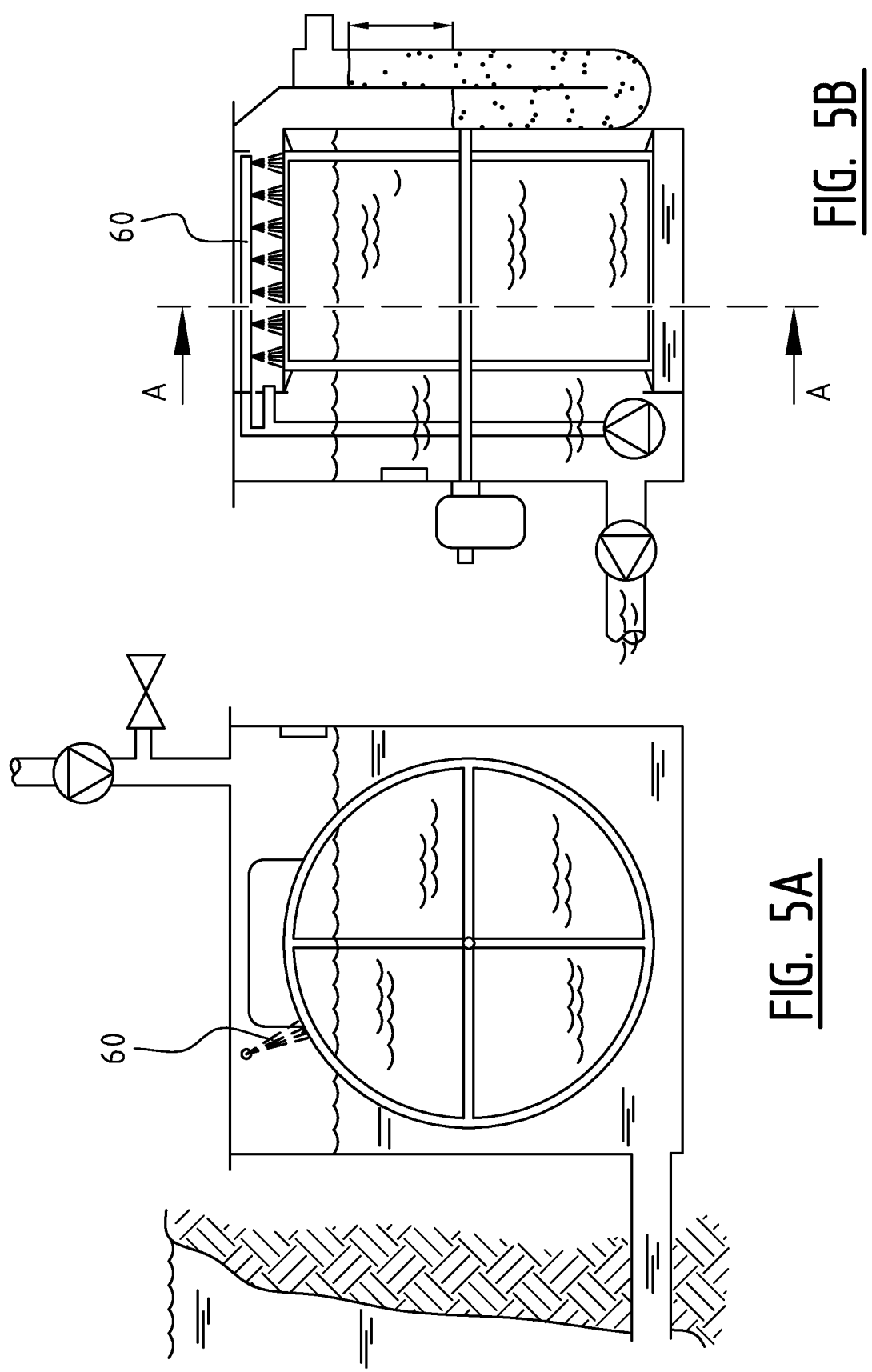
Figure 7:
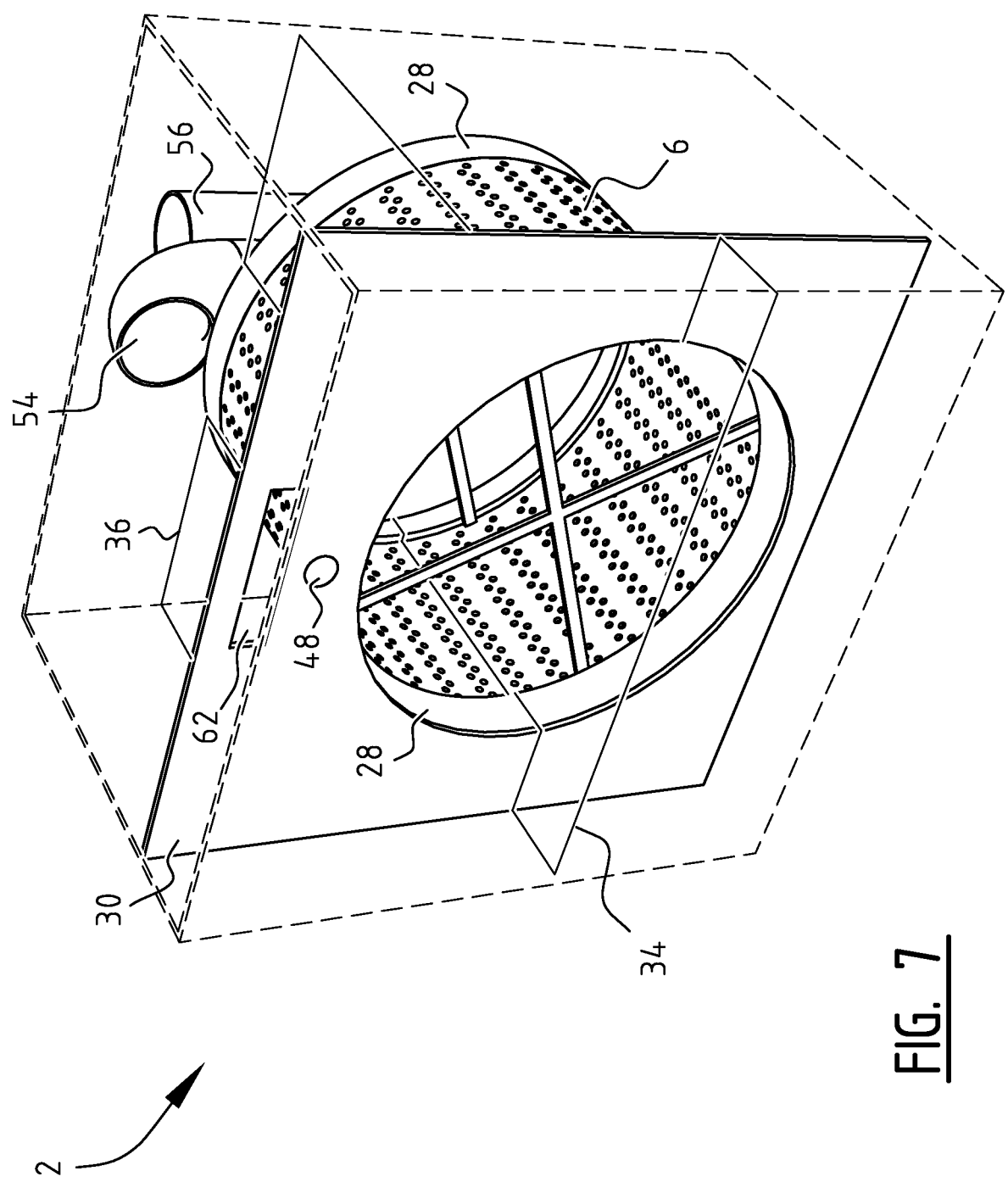
Figures 9A, 9B:
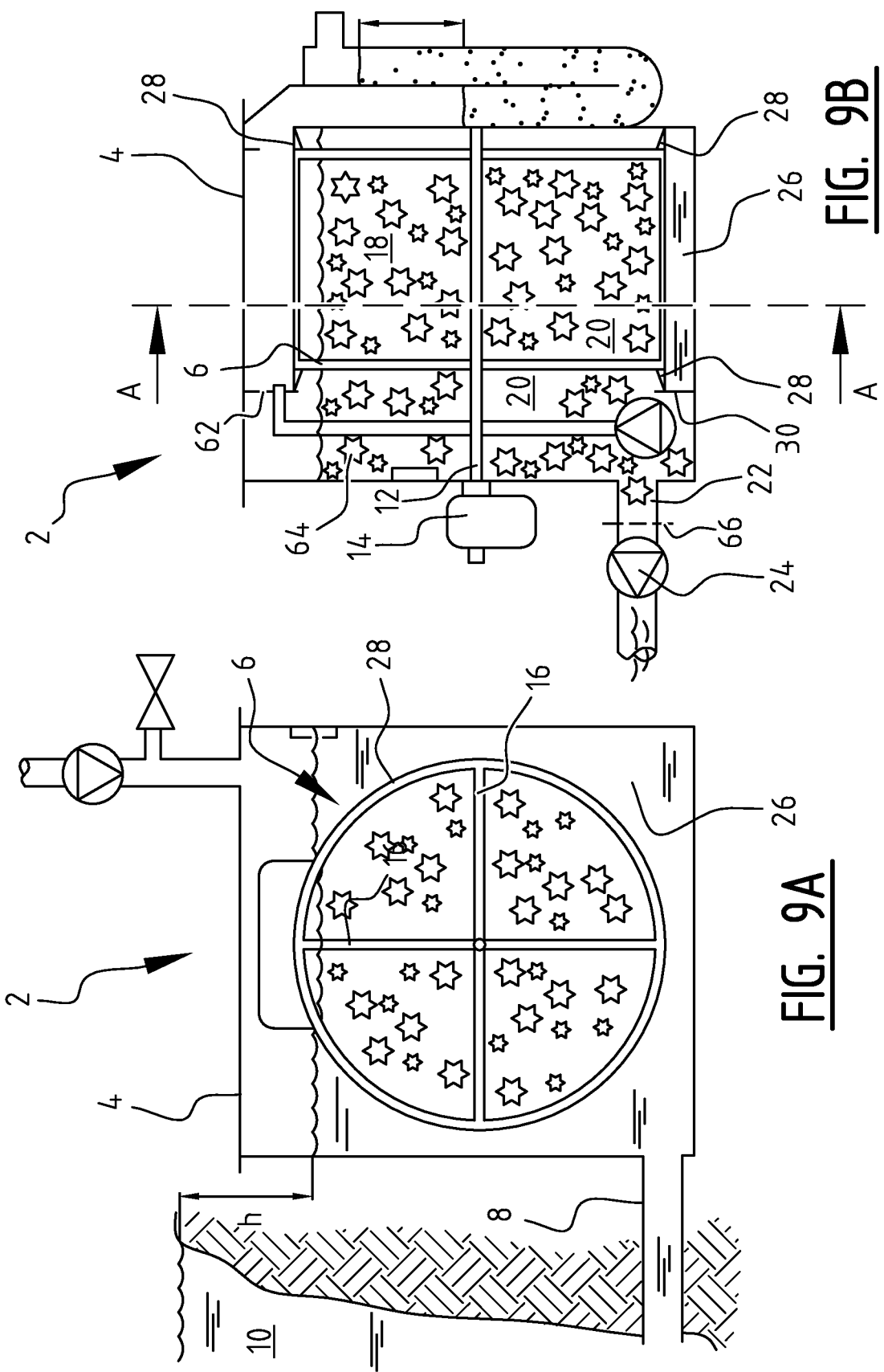

FIGS. 1A-B show schematically the construction of the drum filter in an arrangement in which the water level in the drum filter lies below the water level of the pond with the water for cleaning;

FIGS. 2A-B show schematically the filtering of the water with the drum filter;

FIGS. 3A-B show schematically the cleaning step in which the filter surface is washed clean;

FIGS. 4A-B show schematically a flushing step in which the outlet is flushed;

FIGS. 5A-B show schematically additional sprayers;

FIGS. 6A-B show schematically an alternative arrangement in which the water level in the drum filter lies above the water level in the pond with the water for cleaning;

FIG. 7 shows a view of a drum filter according to the invention, wherein the partition wall between the inlet chamber and the outlet chamber is shown schematically;

FIGS. 8A-B show schematically an alternative arrangement in which the water level in the drum filter is equal to the water level in the pond;

FIGS. 9A-B show schematically a drum filter according to the invention provided with bio-carriers; and FIGS. 10A-B show schematically a further alternative embodiment of a drum filter according to the invention.

Drum filter 2 (FIGS. 1A-B) comprises a housing 4 in which a cylindrical filter drum 6 is arranged. The cylindrical surface, i.e. the curved surface of drum 6, is provided with a filter surface (not shown). This filter surface can for instance be embodied as a screen or a filter cloth. Drum filter 2 is connected via inlet 8 to a pond 10 for feed of water for cleaning into housing 4.

Filter drum 6 is arranged rotatably on a shaft 12 which is connected to an electric motor 14 for driving drum 6. On its rear side filter drum 6 is provided with spokes 16. Drum 6 is however open between spokes 16 so that the inner side 18 of drum 6 is in open connection with an outlet chamber 20 (FIG. 1B). Outlet chamber 20 is provided with an outlet 22 for discharge of filtered water. Provided in outlet 22 in the shown embodiment is a pump 24 which can pump the filtered water in the direction of pond 10. A valve is for instance also provided in outlet 22.

Outlet chamber 20 is separated from an inlet chamber 26. The inlet chamber is connected to inlet 8. Rubber seals 28 which co-rotate with drum 6 are provided on the periphery of the side surfaces of the drum. Seals 28 on the rear side of the drum (on the left in FIG. 1B) make contact with partition wall 30. The partition wall is clearly discernible in FIG. 7. Partition wall 30 has in this embodiment the form of a plate which extends between the side walls, bottom and upper side of housing 4, wherein the plate has a round recess which corresponds with drum 6. Seals 28 make contact with wall 30. Inlet chamber 26 is in this way separated from outlet chamber 20, wherein the water can flow from inlet chamber 26 to outlet chamber 20 only via the filter surface of the drum. Fouling 32 (FIG. 2A), such as excreta of fish and algae, accumulates here on the filter surface of drum 6.

Because increasingly more fouling 32 accumulates on the filter surface, increasingly less water will flow through the filter surface. Because the pump moreover continues to discharge filtered water, the water level 34 in outlet chamber 20 will fall relative to the water level 36 in inlet chamber 26. Outlet chamber 20 comprises a level sensor 38 which detects when the water level falls below a predetermined level. If this is the case, a cleaning step is started via a controller (not shown) in order to clean the filter surface.

In order to indicate the difference between the water in inlet chamber 26 and outlet chamber 20 even more clearly in FIGS. 1-6 the water in outlet chamber 20 is provided with wave-like markings, while the water in inlet chamber 26 is provided with horizontal markings.

The water level in inlet chamber 26 is regulated using air pressure. Provided for this purpose is an air pump 40, which in the shown embodiment applies an air pressure above atmospheric pressure in the housing. Housing 4 is embodied for this purpose as pressure chamber to which air pump 40 is connected via channel 42. A side branch of channel 42 is provided with a valve 44 in order to prevent a vacuum. A second level sensor 46 is provided for the purpose of measuring water level 36 in inlet chamber 26. When sensor 46 detects a rise in water level 36, air pump 40 is controlled via a controller (not shown) in order to increase the pressure. When sensor 46 detects a fall in water level 36, this controller switches off air pump 40 and valve 44 is opened in order to reduce the air pressure. The figures B and FIG. 7 show that an opening 62 is provided in the upper side of partition wall 30. This opening ensures that the air pressure in inlet chamber 26 and outlet chamber 20 is substantially equal. The opening is provided at a height such that no water flows from inlet chamber 26 to outlet chamber 20.

The difference h between the desired water level 36 and the water level in the pond also determines the air pressure which is built up in housing 4. Rule of thumb here is that 1 metre water column corresponds to a hydrostatic pressure of about 0.1 bar. If the difference h between the water level in pond 10 and the water level 36 in housing 4 is for instance 30 centimetres, the system will then set the air pressure in housing 4 to about 1.03 bar. In the above static approach the flow resistance of inlet 8 was one of the factors not taken into account, so that the actual pressure in housing 4 may differ from this approach.

As elucidated above, a cleaning step is performed as soon as sensor 38 detects that the water level 34 in outlet chamber 20 falls below a predetermined level. This cleaning step is elucidated in FIGS. 3A-3B. Motor 14 drives drum 6 via shaft 12 so that it begins to rotate as according to arrow R or in opposite direction. Provided above drum 6 is a sprayer 48 which is connected to a water supply 50. In the shown embodiment water supply 50 is connected to a pump 52 which is provided in outlet chamber 20. The filtered water in outlet chamber 20 can in this way be used to spray clean the filter surface. Alternatively, the sprayer is connected to an external water conduit. As shown in the figures, sprayer 48 extends through the upper part of partition wall 30. The throughfeed of the spray nozzle is sealed here so that no passage is created from inlet chamber 26 in the direction of outlet chamber 20.

Sprayer 48 is configured to spray water over the outer surface of the filter drum, since this is the side on which fouling 32 has accumulated. Sprayer 48 is moreover configured to spray substantially transversely over this surface, i.e. substantially parallel to shaft 12. The water jet produced by sprayer 48 sprays the fouling 32 in the direction of a discharge opening 54 of a fouling discharge. The sprayer is preferably located centrally relative to the filter surface, as shown in FIG. 7. The fouling discharge comprises a swan neck 56 in order to prevent the pressure being lost in housing 4. The fouling is discharged via swan neck 56. The fouling discharge is connected for instance to the sewer for this purpose. It is likewise possible to further treat or to store the fouling discharged with the water.

Every now and then the fouling which accumulates in the swan neck has to be flushed out (FIGS. 4A-4B). Discharge pump 24 is switched off and a controller then controls air valve 44 in channel 42 so that it opens. Air pump 40 and discharge pump 24 are moreover switched off. Valve 58 is optionally closed. Because the pressure in housing 4 now decreases, the water level 34, 36 rises above discharge opening 54. All the fouling 32 from housing 4 and from swan neck 56 is discharged under pressure. In combination with the flushing the drum screen 6 can also rotate and sprayer 48 can spray additionally. Following flushing the water level can be restored to the former level by closing the valve 44, switching on discharge pump 24 and air pump 40 again and optionally opening the valve 58.

Drum filter 2 preferably comprises one or more additional sprayers 60 (FIGS. 5A-5B). These additional sprayers 60 are directed at the filter surface of drum 6 so that fine fouling particles can be removed from the filter surface. The additional sprayers lie roughly perpendicularly of the filter surface, but can for instance lie at something of an angle as shown in FIG. 5A. This angle is for instance less than 60 degrees, preferably less than 45 degrees, still more preferably less than 30 degrees, and most preferably less than or equal to 15 degrees. A cleaning step is for instance performed with the additional sprayers 60 following an adjustable number of cleaning steps with sprayer 48 as described with reference to FIGS. 3A-3B.

For the purpose of cleaning with additional sprayers 60 the drum is preferably rotated counter-clockwise as according to the figures A, wherein both sprayer 48 and sprayers 60 are switched on. The upper part of the drum in this way first passes sprayer 48, which washes the coarser fouling away in the direction of discharge opening 54, after which the surface from which large fouling particles have been removed has fine fouling particles removed by sprayers 60. This prevents sprayers 60 spraying larger fouling particles fixedly into the surface. It is noted that the rotation during the cleaning step according to FIGS. 3A-3B is preferably in opposite direction, i.e. clockwise.

In the above embodiment housing 4 is arranged under the water level in pond 10. It is likewise possible according to the invention to place the drum filter at or above the level in the pond. FIGS. 6A-6B show an example in which the drum filter is situated above the level in the pond. Air pump 40' is in this case configured to apply an underpressure in housing 4. The height difference h' between the water level 36 in housing 4 and the water level in pond 10 now determines the underpressure created in housing 4 by air pump 40'. The water level can again be regulated using a controller (not shown) and level sensor 46. It is noted that an air pump can be applied which can be set to create an underpressure or an overpressure depending on the height at which the drum filter is placed.

In the case that the water level in the housing is roughly equal to the level in the pond it is possible to dispense with a pressure chamber. This situation is shown in FIGS. 8A-8B. The means for regulating the water level in the inlet chamber (components 40, 42, 44, 46 in FIG. 2A) are not present here.

In an embodiment according to the invention (FIGS. 9A-9B) bio-carriers 64 are arranged in the drum filter. These are carriers on which a biofilm can form for the purpose of biological cleaning of the water. Carriers of the Kaldnes brand are for instance used.

A grating 66 is provided in outlet 22 so that the bio-carriers are not flushed out of the system with the water.

In an alternative embodiment (FIGS. 10A-10B) no partition wall 30 is provided, but a more compact installation is obtained by having drum 6 connect directly to the outer wall of housing 4 via rubber seals 28 (FIG. 10B). Instead of outlet chamber 20 comprising an additional space connecting to the inner side of drum 6, this additional space is omitted in the embodiment of FIGS. 10A-B. The present invention is by no means limited to the above described preferred embodiments thereof. The rights sought are defined by the following claims, within the scope of which many modifications can be envisaged.

The invention claimed is:

1. Drum filter for water filtration, comprising:
   a housing;
   a filter drum arranged in the housing and comprising a filter surface;
   a shaft disposed through the filter drum, wherein the filter drum is rotatable around the shaft;
   an inlet for supplying water for filtering to an outward facing side of the filter surface for the purpose of collecting fouling on the filter surface;
   an outlet for discharging filtered water; and
   a sprayer for spraying clean the filter surface, wherein the sprayer is disposed within the housing and angled to spray in a direction substantially parallel to said shaft over the outward facing side of the filter surface.

2. Drum filter as claimed in claim 1, comprising a fouling discharge with a receiving opening arranged substantially opposite the sprayer for the purpose of receiving fouling sprayed off the filter surface in the direction of the receiving opening by the sprayer.

3. Drum filter as claimed in claim 2, wherein the fouling discharge comprises a swan neck.

4. Drum filter as claimed in claim 2, wherein the drum filter further comprises:
   an air pump for adjusting an air pressure in the housing;
   a level sensor to measure a water level in the housing; and
   a controller to control the air pump on the basis of the water level measured by the level sensor for the purpose of setting a water level in the housing, wherein the fouling discharge comprises a swan neck.

5. Drum filter as claimed in claim 1, comprising an additional sprayer which is arranged in the housing to spray a fluid substantially through the filter surface.

6. Drum filter as claimed in claim 5, wherein the additional sprayer is orientated to spray the fluid substantially in a direction perpendicularly of the shaft.

7. Drum filter as claimed in claim 1, further comprising a drive coupled to the shaft for rotating the filter drum and a controller which is operatively connected to the drive and to the sprayer and/or the additional sprayer, which controller performs a cleaning step by rotating the filter drum and/or spraying with the sprayer and/or the additional sprayer.

8. Drum filter as claimed in claim 7, further comprising a level sensor to measure a water level in the filter drum, wherein the controller starts the cleaning step when a water level in the filter drum measured by the level sensor falls below a determined threshold value.

9. Drum filter as claimed in claim 7, wherein the controller reverses the rotation direction of the filter drum after one or more cleaning steps.

10. Drum filter as claimed in claim 1, wherein the filter drum comprises a plurality of openings defined between a plurality of spokes so that the pressure on the inner side of the filter drum and the pressure on the outer side of the filter drum are substantially equal.

11. Drum filter as claimed in claim 1, further comprising means for regulating the water level.

12. Drum filter as claimed in claim 11, wherein the drum filter further comprises:
- an air pump for adjusting an air pressure in the housing;
- a level sensor to measure a water level in the housing; and
- a controller to control the air pump on the basis of the water level measured by the level sensor for the purpose of setting a water level in the housing.

13. Drum filter as claimed in claim 1, further comprising a supply conduit connected to the sprayer to supply filtered water to the sprayer.

14. Method for providing a drum filter, comprising the following steps of:
- providing a housing;
- arranging in the housing a filter drum which comprises a filter surface;
- providing a shaft disposed through the filter drum, wherein the filter drum is arranged for rotation around the shaft;
- carrying water for filtering from an outward facing side of the filter surface to the inner side of the drum filter for the purpose of collecting fouling on the outward facing side of the filter surface;
- spraying the filter surface clean by spraying a fluid in a direction substantially parallel to said shaft over the outward facing side of the filter surface.

15. Method as claimed in claim 14, further comprising providing air to the housing with a pressure differing from atmospheric pressure.

16. Method as claimed in claim 15, further comprising of coupling the inlet of the drum filter to a basin with water for cleaning and of setting a desired water level in the housing by controlling the air pressure in the pressure chamber, wherein the desired water level differs from the water level in the basin.

17. Drum filter for water filtration, comprising:
- a housing;
- a filter drum arranged in the housing and comprising a filter surface;
- a shaft disposed within the filter drum, wherein the filter drum is rotatable around the shaft;
- an inlet for supplying water for filtering to an outward facing side of the filter surface for the purpose of collecting fouling on the filter surface;
- an outlet for discharging filtered water; and
- a sprayer for spraying dean the filter surface, wherein the sprayer is disposed within the housing to spray substantially transversely over the outward facing side of the filter surface, wherein the sprayer is disposed within the housing and angled to spray substantially in a direction parallel to the shaft, comprising a fouling discharge with a receiving opening arranged substantially opposite the sprayer for the purpose of receiving fouling sprayed off the filter surface in the direction of the receiving opening by the sprayer.

18. Drum filter as claimed in claim 17, comprising an additional sprayer which is arranged in the housing to spray a fluid substantially through the filter surface.

19. Drum filter as claimed in claim 17, further comprising a drive coupled to the shaft for rotating the filter drum and a controller which is operatively connected to the drive and to the sprayer and/or the additional sprayer, which controller performs a cleaning step by rotating the filter drum and/or spraying with the sprayer and/or the additional sprayer.

* * * * *